April 26, 1932. T. M. EDISON 1,855,570
VIBRATION ELIMINATING MEANS
Filed Feb. 28, 1928

INVENTOR
Theodore M. Edison
BY
Henry Lanahan
ATTORNEY

Patented Apr. 26, 1932

1,855,570

UNITED STATES PATENT OFFICE

THEODORE M. EDISON, OF EAST ORANGE, NEW JERSEY, ASSIGNOR TO THOMAS A. EDISON, INCORPORATED, OF WEST ORANGE, NEW JERSEY, A CORPORATION OF NEW JERSEY

VIBRATION ELIMINATING MEANS

Application filed February 28, 1928. Serial No. 257,776.

My invention relates to vibration eliminating means and more particularly to such means as applied to or embodied in mechanisms which are subjectable to forces tending to set up vibrations therein.

The principal object of my invention is to eliminate, or at least greatly reduce, vibrations and especially those of certain definite frequencies, from mechanisms which are subjectable to forces tending to set up such vibrations. While my invention is applicable to the elimination or reduction of all kinds of periodic vibrations whether of torsion or translation, the most satisfactory results are obtained by the use of my invention in cases where the vibrations to be eliminated or reduced have the character of simple harmonic motions.

The basis of my invention may be briefly described as follows:

A system may be made up of elastic means coacting with a mass or masses so as to have a natural period of vibration dependent upon the constants of the system. If such a system is applied to a mechanism subjected to the action of a periodic force and if the natural period of vibration of the system is made equal to the period of the impressed force and if the system is so arranged as to be capable of displacements which will set up a resultant force in the line of and equal and opposite to the impressed force, I find that the system will then actually tend to vibrate in such a way that the force it sets up in the mechanism will exactly neutralize the impressed force. The presence of friction and various damping effects would prevent the neutralization from being perfect, but if these factors are kept small and the amplitudes of the vibrations in the system are not so great as to cause substantial deviations from Hooke's law, the system will neutralize most of the effect upon the mechanism, of the impressed force of the given frequency.

As a rule a system such as just described, when applied to a mechanism, while effective to eliminate or greatly reduce vibrations of a certain frequency, tends to intensify vibrations of another frequency. It is therefore necessary to select the constants of the system in such a way that the frequency which it tends to intensify will not coincide with the frequency of any force which may be impressed upon the mechanism. In general this "intensifying frequency" will depend not only upon the constants of the system, but also upon the constants of the mechanism to which it is to be applied. For this reason, it will be necessary to modify the constants of the system, which may be properly described a vibration eliminator, to suit the conditions under which it operates.

It is to be understood that my invention is not only applicable to practically all types of mechanisms for eliminating or reducing all kinds of periodic vibrations as indicated above, but is also capable of being expressed in many different mechanical forms. For the purposes of illustration, however, I shall proceed to describe a simple embodiment of my invention as applied to a mechanism having an unbalanced rotating element, as, for example, an electric motor having an unbalanced armature shaft.

In the drawings accompanying and forming a part of this specification:

Figure 1:
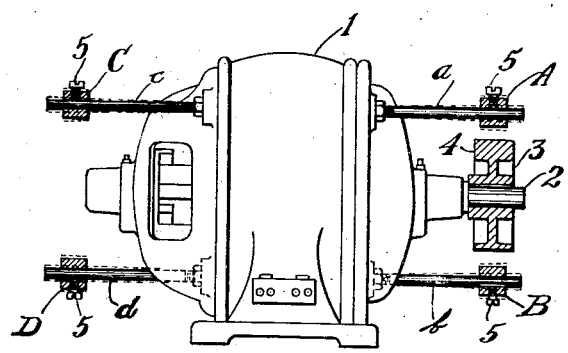
Figure 1 is a front elevation of an electric motor having applied thereto vibration eliminating means in accordance with my invention.
Figure 2:
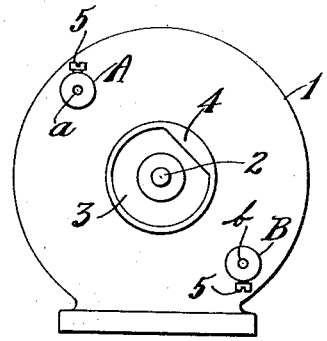
Fig. 2 is an end elevation looking from the right in Fig. 1.
Figure 4:
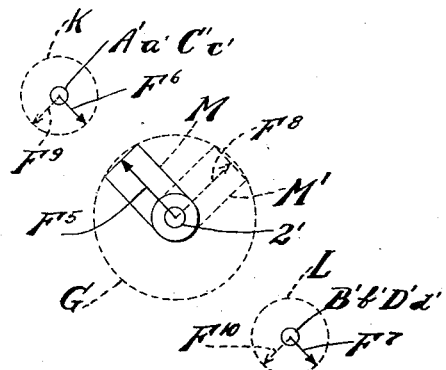
Figures 3, 5:
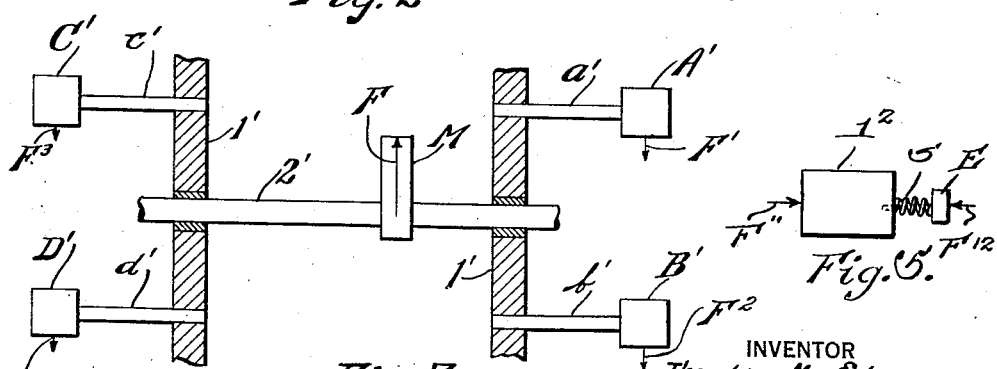

Figs. 3 and 4 are diagrammatic views respectively corresponding to Figs. 1 and 2, and illustrating how the vibration eliminating means acts to neutralize the effect of the force impressed on the motor by reason of the unbalanced condition of its armature shaft; and Fig. 5 is a somewhat diagrammatic view showing a mechanism having applied thereto means adapted to eliminate or reduce vibrations which a periodic force impressed on the mechanism and acting in a fixed line, tends to set up in the mechanism.

Referring to the drawings, and particularly to Figs. 1 and 2, reference character 1 represents the frame of a conventional form of electric motor; 2 the armature shaft of the motor, and 3 a pulley or flywheel secured to the shaft. The armature shaft 2 of this motor is unbalanced, this unbalanced condition being indicated by the thickened part 4 of the flange of the pulley or flywheel 3, and when the motor is operated at its normal constant speed, there will be impressed thereon, because of such unbalanced condition, a periodic force tending to set up in the motor vibrations having the character of simple harmonic motions. In this particular case, the "system" or vibration eliminating means applied to the mechanism comprises the four vibrators Aa, Bb, Cc and Dd arranged as indicated about the armature shaft 2. Each of these vibrators consists of a weighted resilient rod having such dimensions that the natural period thereof is substantially the same as the period of rotation of the shaft 2 when the motor is operating at normal speed, in other words, each vibrator is tuned to the frequency of the periodic force impressed on the motor by reason of the unbalanced condition of shaft 2, that is, to the frequency of the vibrations which it is designed or intended to eliminate or reduce. The rods, a, b, c and d of the vibrators are preferably suitably fixed at one end to the motor frame 1, and have the weights A, B, C and D respectively secured thereto, as by set-screws 5, at points remote from their said ends. For best results, the axes of the four vibrators should be in a common plane with the axis of rotation of the unbalanced rotatable element or shaft 2, and they are shown as so located.

While the vibrations which the impressed periodic force tends to set up in the motor illustrated herein can be very greatly reduced by the use of any number of said vibrators less than four, in this case it is essential in order to most effectively neutralize the effect of said impressed force, to employ four such vibrators arranged as shown, rather than one, two or three. The reason for this will be apparent from a consideration of Figs. 3 and 4 and the explanation which follows. In these two diagrammatic figures the motor frame, armature shaft and vibrators of the structure shown in Figs. 1 and 2, are respectively represented by corresponding parts designated 1', 2', A'a', B'b', C'c' and D'd', and the unbalanced condition of the armature shaft 2 is represented by the mass M eccentrically mounted on the rotatable element or shaft 2'. It will be apparent that when the motor is operating the force impressed thereon by reason of the unbalanced condition of its shaft, as represented by the mass M (Figs. 3 and 4), always acts in a radial direction with reference to the axis of rotation of said shaft, and that the line of action of this force while continually changing as the shaft rotates, always remains in a single plane which is normal to said axis of rotation. The amount and line of action of this impressed force, for the position of the mass M shown in Fig. 3, is represented in this figure by the arrow F, the amounts and lines of action of such force for the full and dotted line positions M and M' of the mass, as shown in Fig. 4, are respectively represented in the latter figure by the full and dotted arrows $F^5$ and $F^8$, and the locus of the amounts and lines of action of such force are represented by a circular plane figure indicated by the dotted circle G in Fig. 4. It will be seen that the "system" or vibration eliminating means as shown comprises two pairs of vibrators Aa, Bb and Cc, Dd (Figs. 1 and 2), or A'a', B'b' and C'c', D'd' (Figs. 3 and 4), respectively applied to the motor at either side of the plane of action of the impressed force, and that the vibrators Aa, Cc, or A'a', C'c', and Bb, Dd, or B'b', D'd', of said pairs of vibrators are respectively applied to the motor at either side of the axis of rotation of the motor shaft.

Referring now to Fig. 3, as the mass M, in the normal rotation of shaft 2', reaches the position shown, the force F which it exerts on the shaft is theoretically exactly neutralized by the forces, represented by the arrows F', $F^2$, $F^3$ and $F^4$, respectively exerted by the vibrators A'a', B'b', C'c' and D'd'. In case the mass M is located, as shown in Fig. 3, so that the force F which it exerts is impressed on the shaft 2'' at a point which is not midway between the shaft bearings, the amplitudes of the vibrators of vibrators A'a' and B'b' will differ from those of vibrators C'c' and D'd', but will automatically so adjust themselves that the algebraic sum of the five forces shown, as well as the algebraic sum of the couples produced by these forces, will be zero. (This peculiarity may be utilized in dynamic balancing machines). If the vibrators C'c' and D'd' were omitted the combined forces exerted by vibrators A'a' and B'b' would be equal and opposite to the force exerted by the mass M, but the resultant line of action of said combined forces would not then coincide with or pass along the line of action of said force exerted by mass M and this would leave an unbalanced couple. In Fig. 4, the full line position of mass M corresponds to the position of said mass shown in Fig. 3, and the full line arrows $F^5$ represents the amount and line of action of the force then exerted on shaft 2' by this mass and corresponds to the arrow F in Fig. 3. The combined resultants of the forces exerted by the pairs of vibrators A'a', C'c' and B'b', D'd', which resultants are respectively represented by the solid arrows $F^6$ and $F^7$, will then be equal and opposite to the force $F^5$. The direction of each of the said resultants of the forces exerted by the pairs of vibrators A'a', C'c' and B'b', D'd' continually changes as shaft 2' rotates, but is always radial with reference to the axes of the respective pair of vibrators and in a plane normal thereto, the loci of such resultants respectively being two circular plane figures represented in Fig. 4 by the dotted line circles K and L. When the mass reaches the dotted line position M' (Fig. 4) the force then exerted thereby, the amount and line of action of which is represented by the dotted line arrow F⁸, is neutralized by the combined resultants of the forces then exerted by the pairs of vibrators A'a', C'c' and B'b', D'd', the amounts and directions of which resultants are respectively properly represented by the dotted line arrows F⁹ and F¹⁰. It will now also be apparent that in case the vibrators disposed at either side of the axis of rotation of shaft 2' were omitted, while the combined forces exerted by the remaining vibrators would be equal and opposite to the force due to the mass M, the resultant of such combined forces would not be in the line of action of the said force exerted by mass M and an unbalanced couple would result.

In case it is desired to eliminate vibrations from a mechanism due to a periodic force impressed on the mechanism and acting in a fixed line, this can be accomplished by employing a "system" or vibration eliminator comprising but a single vibrator so applied to the mechanism as to exert a force which will act in the same line as the action of the impressed force. Such an arrangement is shown in Fig. 5 wherein 1² represents a mechanism and F¹¹ the amount and line of action of a periodic force impressed on such mechanism and acting in a fixed line. To eliminate the vibrations which the force F¹¹ tends to set up in the mechanism 1², I employ a "system" comprising the single mass E resiliently connected to and supported from said mechanism by a coil spring S, the ends of which spring are respectively fixedly secured to the mechanism and the mass. This "system" is preferably so designed that its natural period of vibration is substantially the same as the period of the impressed force F¹¹ and is connected to the mechanism 1² so that the force F¹² it exerts will act in the same line as the impressed force F¹¹.

In the torsional case where the object is to eliminate oscillatory vibrations from a rotary element, the simplest form of "system" or vibration eliminator to use for attaining such object would probably be a flywheel elastically connected to the rotary element in such a manner as to make the natural period of oscillation thereof equal to the period of the oscillations which it is designed to eliminate.

As hereinbefore indicated my vibration eliminating means is especially adapted for application to mechanisms which are subjected to impressed forces of constant magnitude and frequency. In mechanisms where these conditions are not present the eliminating means will be less effective, due to transient effects.

Having now fully described my invention, what I claim as new and desire to protect by Letters Patent is as follows:

1. The combination with a mechanism subjectable to the action of an impressed force tending to set up vibrations of a substantially definite period, of means for reducing such vibrations comprising a plurality of vibrators each consisting of a mass elastically connected to said mechanism, said means having a natural period of vibration substantially the same as the period of the vibrations which it is designed to reduce, the said vibrators being so applied to said mechanism that the resultant line of action thereof substantially coincides with the line of action of the impressed force, substantially as described.

2. The combination with a mechanism subjectable to the action of an impressed force tending to set up vibrations of a substantially definite period and substantially of the character of simple harmonic motions, of means for reducing such vibrations comprising a plurality of vibrations each consisting of a mass elastically connected to said mechanism said means having a natural period of vibration substantially the same as the period of the vibrations which it is designed to reduce, the said vibrators being so applied to said mechanism that the resultant line of action thereof substantially coincides with the line of action of the impressed force, substantially as described.

3. The combination with a mechanism comprising an unbalanced rotatable element which when rotated at a given speed tends to set up vibrations of a substantially definite period in said mechanism, of means for reducing such vibrations comprising two vibrators respectively applied to said mechanism at either side of the axis of rotation of said element, each of said vibrators consisting of a weighted resilient member fixed at one end to said mechanism, said vibrators having a natural period of vibration substantially the same as the period of the vibrations which it is designed to reduce, substantially as described.

4. The combination with a mechanism comprising an unbalanced rotatable member which when rotated at a given speed exerts, by reason of its unbalanced condition, a force acting in a plane and tending to set up vibrations of a substantially definite period in said mecahnism, of means for reducing such vibrations comprising two vibrators respectively applied to said mechanism on either side of the said plane of action of said force, said vibrators having a natural period of vibration substantially the same as the period of the vibrations which it is designed to reduce, substantially as described.

5. The combination with a mechanism comprising a frame and an unbalanced rotatable element mounted on said frame and which when rotated at a given speed exerts, by reason of its unbalanced condition, a force acting in a plane and tending to set up vibrations of a substantially definite period in said mechanism, of means for reducing such vibrations comprising two pairs of vibrators each consisting of a weighted resilient member fixed at one end to said frame, said pairs of vibrators being respectively applied to said mechanism at either side of the said plane of action of said force, the vibrators of each of said pairs of vibrators being respectively applied to said mechanism at either side of the axis of rotation of said element, and all of said vibrators having a natural period of vibration substantially the same as the period of the vibrations which it is designed to reduce, substantially as described.

6. The combination with a mechanism comprising a frame and an unbalanced rotatable member mounted on said frame and which when rotated at a given speed exerts, by reason of its unbalanced condition, a force acting in a plane and tending to set up vibrations of a substantially definite period in said mechanism, of means for reducing such vibrations comprising two pairs of vibrators each consisting of a weighted resilient rod fixed at one end to said frame, said pairs of vibrators being respectively applied to said mechanism at either side of the said plane of action of said force, the vibrators of each of said pairs of vibrators being respectively applied to said mechanism at either side of the axis of rotation of said member, all of said vibrators having a natural period of vibration substantially the same as the period of the vibrations which it is designed to reduce, and the axes of all of said resilient weighted rods being in a common plane with said axis of rotation, substantially as described.

7. The combination with a mechanism comprising an unbalanced rotatable means which when rotated at a given speed tends to set up vibrations of a substantially definite period in the mechanism, of means for reducing such vibrations comprising a vibratory system having a plurality of masses each elastically connected to such mechanism, the natural period of vibration of said system being substantially the same as the period of the said vibrations which it is designed to reduce, such system being so applied to said mechanism that the effective line of action thereof at any instant substantially coincides with the line of action of the force to which said mechanism is subjected by reason of the unbalanced condition of the said rotatable means, substantially as described.

This specification signed this 27th day of February, 1928.

THEODORE M. EDISON.